(12) United States Patent
Okura

(10) Patent No.: US 11,156,975 B2
(45) Date of Patent: Oct. 26, 2021

(54) ELECTRIC POWER INFORMATION GENERATION DEVICE AND ELECTRIC POWER INFORMATION DISPLAY SYSTEM

(71) Applicant: SHARP KABUSHIKI KAISHA, Osaka (JP)

(72) Inventor: Ataru Okura, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/360,734

(22) Filed: Mar. 21, 2019

(65) Prior Publication Data

US 2019/0294132 A1    Sep. 26, 2019

(30) Foreign Application Priority Data

Mar. 23, 2018    (JP) ............................. JP2018-057179

(51) Int. Cl.
G05B 19/042    (2006.01)

(52) U.S. Cl.
CPC .... *G05B 19/042* (2013.01); *G05B 2219/2639* (2013.01)

(58) Field of Classification Search
CPC ....................... G05B 19/042; G05B 2219/2639
See application file for complete search history.

(56) References Cited

U.S. PATENT DOCUMENTS

| | | | |
|---|---|---|---|
| 2008/0167756 A1* | 7/2008 | Golden | G06N 5/04 700/297 |
| 2010/0292856 A1* | 11/2010 | Fujita | G06Q 10/06 700/291 |
| 2018/0276768 A1* | 9/2018 | Mori | G06Q 50/06 |

FOREIGN PATENT DOCUMENTS

JP    2016-158433 A    9/2016

* cited by examiner

*Primary Examiner* — Gary Collins
(74) *Attorney, Agent, or Firm* — ScienBiziP, P.C.

(57) ABSTRACT

The present invention, in an aspect thereof, has an object to enable the user to readily recognize increases and decreases in an electric power demand in a demand response request event. A server (1) includes a baseline screen generation unit (151) that generates screen display information for displaying a baseline screen showing: a predicted change with time in an electric power demand in a prescribed period in absence of a demand response request; and a change with time in an electric power demand in a demand response request period in accordance with a demand response request.

10 Claims, 7 Drawing Sheets

```
                                      ┌─401
┌─────────────────────────────────┐
│ These appliances are available for │
│              use.                  │
│ ································ │
│                                    │
│  Living Room                       │
│  Air Conditioner      2500W        │
│ ································ │
│                                    │
│  Living Room                       │
│  LED Lights           330W         │
│ ································ │
│                                    │
│  Kid's Room                        │
│  Television           145W         │
│ ································ │
│                                    │
│                                    │
│ ································ │
│                                    │
└─────────────────────────────────┘
```

ELECTRIC POWER INFORMATION GENERATION DEVICE AND ELECTRIC POWER INFORMATION DISPLAY SYSTEM

FIELD OF THE INVENTION

The present invention relates to electric power information generation devices that generate information to display an electric power situation in a demand response event.

BACKGROUND OF THE INVENTION

Demand response mechanisms are attracting attention as an attempt to strike a balance between demand and supply of electric power. The demand response mechanism changes an electric power consumption pattern in such a manner as to discourage electric power consumers from using electric power when there is an increased electric power demand, leaving only a small supply margin, and to encourage electric power consumers to use electric power when there is a sufficient supply margin. For example, electric power consumers may respond to a demand response instruction (request) from an electric power company or a system operating entity to reduce consumption, by using the electric power the consumers have stored up by themselves in storage batteries.

Meanwhile, a VPP (virtual power plant) collectively controls small-scale energy resources located across geographical areas so that the resources can operate as if they were a single power plant. By leveraging a VPP, an electric power consumer can reduce power consumption by power saving and in-house power generation and sell the difference to an electric power company or on the market as if the electric power consumer has generated that electric power. These activities are done by means of, for example, demand responses.

Patent Literature 1 describes collective control of a plurality of electrical appliances by means of demand responses to reduce power consumption.

CITATION LIST

Patent Document

Patent Document 1: Japanese Unexamined Patent Application Publication, Tokukai, No. 2016-158433 (Publication Date: May 1, 2016)

SUMMARY OF THE INVENTION

Problems to be Solved by the Invention

The technology described in Patent Literature 1, however, does not provide the user with a visual display of changes in an electric power demand that are caused by the buying and selling of electric power by electric power consumers. The technology therefore falls short of providing any way for the user to recognize approximately how much the electric power demand will be restricted especially in response to a demand response request.

The present invention, in an aspect thereof, has an object to enable the user to readily recognize increases and decreases in an electric power demand in a demand response request event.

Solution to the Problems

To achieve the object, the present invention, in one aspect thereof, is directed to an electric power information generation device including a first screen generation unit configured to generate screen display information for displaying a first screen showing: a predicted change with time in an electric power demand in a prescribed period in absence of a demand response request; and a change with time in an electric power demand in a demand response request period in accordance with a demand response request.

Advantageous Effects of the Invention

The present invention, in an aspect thereof, enables the user to readily recognize increases and decreases in an electric power demand in a demand response request event.

DESCRIPTION OF EMBODIMENTS

Embodiment 1

The following will describe Embodiment 1 of the present invention in reference to FIGS. 1 to 5.

Configuration of Power Generation System

Figure 2:
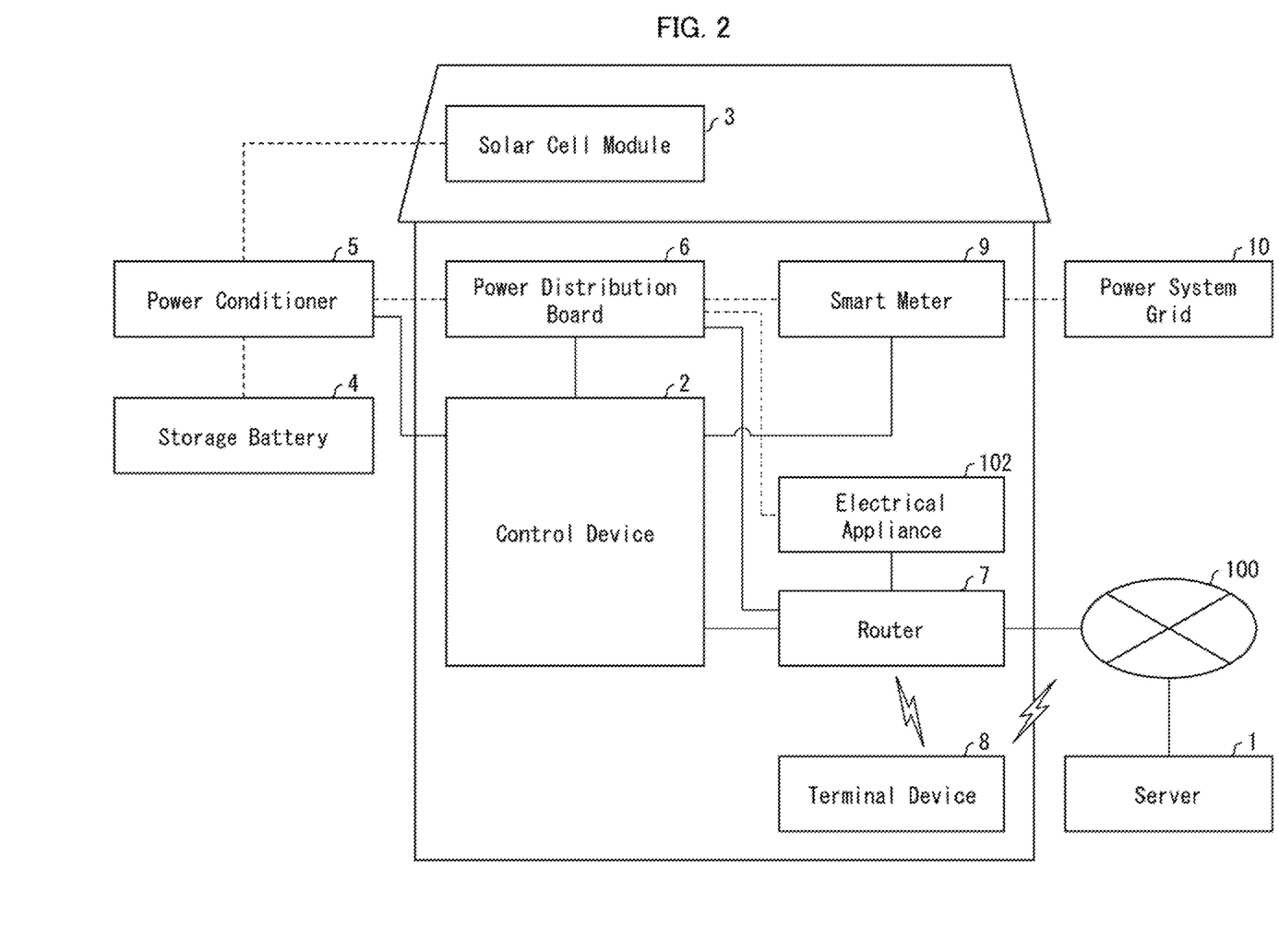
FIG. 2 is a block diagram of a configuration of a power generation system including the demand response simulation system.

A description will be given first of a power generation system. FIG. 2 is a block diagram of a configuration of a power generation system in accordance with the present embodiment. FIG. 2 shows signal lines in solid lines and power lines in broken lines between various members and devices.

Referring to FIG. 2, the power generation system includes a control device 2, a solar cell module 3 (power generation device), a storage battery 4, a power conditioner 5, a power distribution board 6, a router 7, a terminal device 8 (display device), and a smart meter 9. The control device 2, the solar cell module 3, and the power distribution board 6 are installed in a building such as an ordinary house where there is a demand for electric power. The storage battery 4, the power conditioner 5, and the smart meter 9 are installed outdoors. The storage battery 4 and the power conditioner 5 may alternatively be installed indoors.

The storage battery 4 stores an electric power output of the solar cell module 3 and discharges as needed for an electric power output to the power conditioner 5.

The power conditioner 5 controls the operating voltage of the solar cell module 3 so that the solar cell module 3 can generate a maximum power at all times, converts a power output of the solar cell module 3 or the storage battery 4 from DC to AC to supply the resultant AC power to the power distribution board 6. The power conditioner 5 also exports to a power system grid 10 excess electric power that is a difference obtained by subtracting the electric power stored in the storage battery 4 and the electric power supplied to loads (electrical appliances 102 shown in FIG. 1) connected to the power distribution board 6 from the electric power generated by the solar cell module 3.

The power conditioner 5 measures electric energy generation by the solar cell module 3 (generated electric energy), electric energy charge to the storage battery 4 (charged electric energy), and electric energy discharge from the storage battery 4 (discharged electric energy). The power conditioner 5 also measures electric power generation by the solar cell module 3 (generated electric power), electric power charge to the storage battery 4 (charged electric power), and electric power discharge from the storage battery 4 (discharged electric power).

The power distribution board 6 distributes AC power from the power conditioner 5 or the power system grid 10 to electric outlets in the building and includes various breakers. The power distribution board 6 supplies AC power to the electrical appliances 102 in the building via the outlets.

The router 7 is a broadband router that relays LAN communications with the terminal device 8 installed in the building. The router 7 is connected to the control device 2 via a LAN cable for wired LAN communications with the control device 2. The router 7 is also connected to a network 100 (the Internet).

The control device 2 controls an HEMS (home energy management system). Specifically, the control device 2, for example, single-handedly manages information on the energy (electric power) consumed in the building and provides an integrated platform for operating the various electrical appliances 102 such as home electrical appliances. The control device 2 collects electric energy information from the smart meter 9 and provides the collected electric energy information to a server 1 (see FIG. 1; details will be given later). The control device 2 also performs wired or wireless LAN communications with the terminal device 8 in the building via the router 7 to transmit various information to the terminal device 8. The control device 2 also uploads electric power information to the server 1 over the network 100.

The terminal device 8 is a display device with a LAN or public wireless network communications capability. The terminal device 8 may be a smartphone, a tablet terminal, a laptop computer, or another mobile electrical appliance and may be a fixed-type electrical appliance attached, for example, onto a wall.

The terminal device 8 includes a display panel (not shown) to provide displayability and also includes a touch panel (not shown) to provide operability. The terminal device 8 can be used both in and out of the building if it is a mobile type. The terminal device 8, when used inside the building, relies on the LAN communications capability thereof to communicate directly with the control device 2 via the router 7 or to communicate with the server 1, in order to display incoming electric power information. When used outside the building, the terminal device 8 relies on the public wireless network communications capability thereof to communicate with the server 1, in order to display incoming electric power information.

The terminal device 8 displays a baseline screen, an electric power supply and demand screen, and an available electrical appliance screen, all generated by the server 1, as will be detailed later. The baseline screen, the electric power supply and demand screen, and the available electrical appliance screen will be described later in detail.

The smart meter 9 is a digital appliance for measuring electric energy purchase from an electric power company 101 (see FIG. 1) via the power system grid 10 (purchased electric energy) for use in the building and for measuring electric energy sale to the electric power company 101 (sold electric energy). The smart meter 9 also measures instantaneous power purchase (purchased electric power) and instantaneous power sale (sold electric power), which is necessary to generate an electric power supply and demand screen. Because the smart meter 9 has a communications capability, the smart meter 9 can perform external communications to transmit electric energy measurement data. For this purpose, the smart meter 9 is connected to the power distribution board 6 and the power system grid 10 via a power line.

Configuration of Demand Response Simulation System

Figure 1:
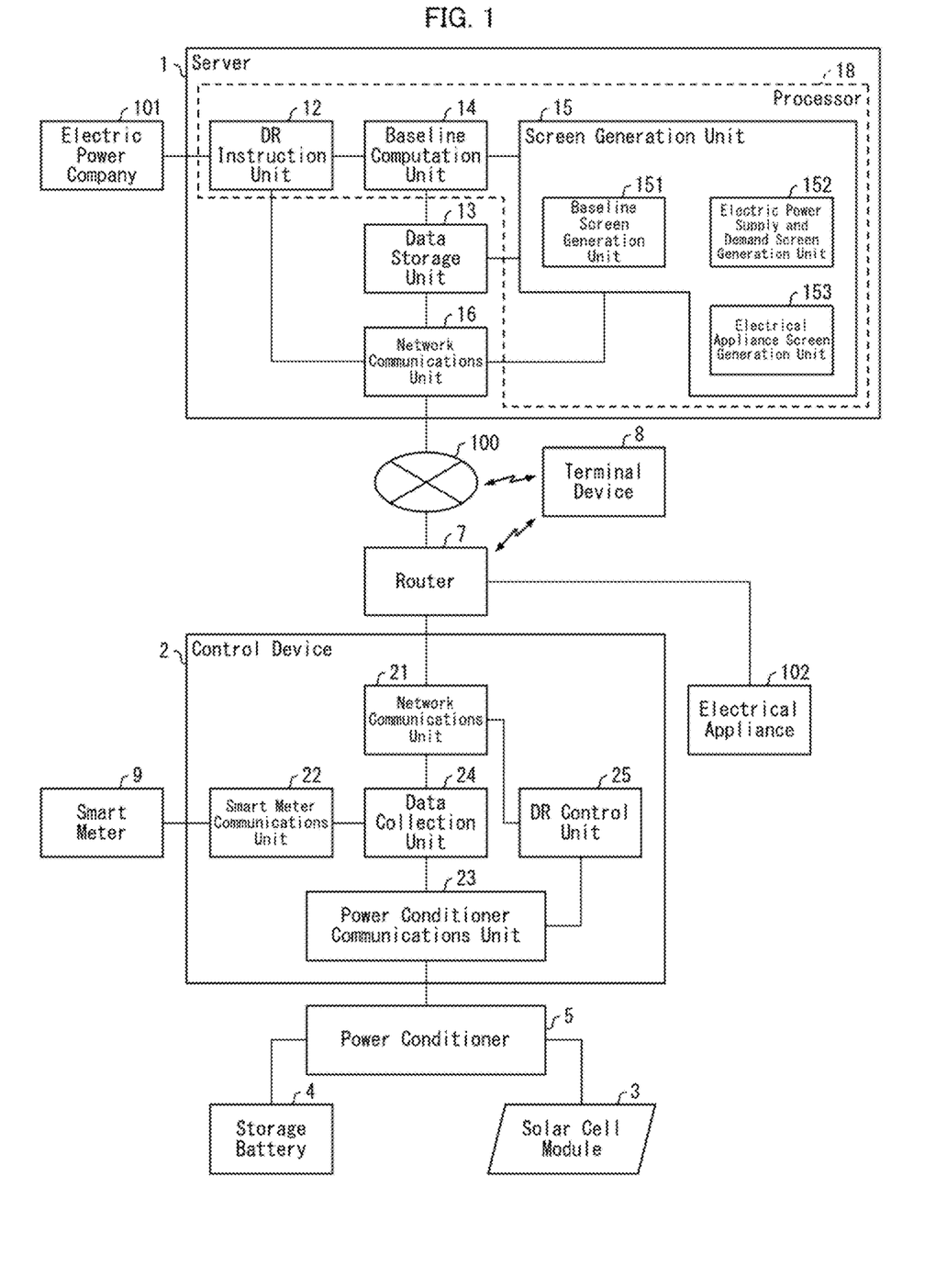
FIG. 1 is a block diagram of a configuration of a demand response simulation system in accordance with Embodiments 1 to 3 of the present invention.

FIG. 1 is a block diagram of a configuration of a demand response simulation system (hereinafter, a "DR simulation system").

Referring to FIG. 1, the DR simulation system (electric power information display system) includes the server 1 (electric power information generation device) and the control device 2.

On the basis of a demand response (hereinafter, a "DR") received from the electric power company 101, the server 1 issues a DR instruction to a plurality of electric power consumers who are negawatt trading contractors or VPP-participating contractors. The server 1 also generates screen display data for displaying the above-mentioned baseline screen, electric power supply and demand screen, and available electrical appliance screen and transmits the generated screen display data to the terminal device 8 owned by the electric power consumer.

The server 1 includes a DR instruction unit 12, a data storage unit 13, a baseline computation unit 14, a screen generation unit 15, and a network communications unit 16 to provide these functions. The DR instruction unit 12, the baseline computation unit 14, and the screen generation unit 15 are functional blocks implemented by a processor 18 running a DR processing program.

The server 1 may be managed and operated by an aggregator and may be managed and operated by an HEMS server operating in concert with an aggregator. Furthermore, the server 1 may be managed and operated by an electric power company 101 alone, by an electric power company 101 that doubles as an aggregator, by an electric power company 101 operating in concert with an aggregator, or jointly by an aggregator and an HEMS server.

The DR instruction unit 12, in response to a DR from the electric power company 101, generates a DR instruction in accordance with contract contents for each electric power consumer and distributes the generated DR instruction to the electric power consumer prior to a DR event. A DR instruction contains a DR event period, either an increase or decrease of electric power consumption, and an electric power adjustment.

The data storage unit 13 stores (contains or records) data on electric energy and instantaneous power that is collected by a data collection unit 24 in the control device 2 and transmitted from the control device 2. Examples of the electric energy include the generated electric energy, charged electric energy, and discharged electric energy as measured by the power conditioner 5 and the purchased electric energy and sold electric energy as measured by the smart meter 9. Examples of the instantaneous power include the generated electric power, charged electric power, and discharged electric power as measured by the power conditioner 5 and the purchased electric power and sold electric power as measured by the smart meter 9.

The data storage unit 13 also stores a list of the electrical appliances 102 for each electric power consumer. The list contains all the electrical appliances 102 that can be controlled by a DR control unit 25 owned by the electric power consumer and power consumptions of the electrical appliances 102.

The baseline computation unit 14 generates a baseline representative of predicted changes with time in an electric power demand in a prescribed period of the day in absence of a demand response request. The baseline computation unit 14 computes a baseline from averages of actual quantities of electric energy sold and purchased over a couple of previous days that are recorded by the data storage unit 13. The baseline computation unit 14 computes a baseline based primarily on electric energy sale and purchase by a publicly known computing method for a VPP. The baseline computation unit 14 also computes how much electric power demand should be decreased or increased relative to the baseline on the basis of a DR instruction distributed to the electric power consumer so that the displayed baseline can reflect the results.

The screen generation unit 15 includes a baseline screen generation unit 151, an electric power supply and demand screen generation unit 152, and an electrical appliance screen generation unit 153.

The baseline screen generation unit 151 (first screen generation unit, second screen generation unit) generates screen display data (screen display information) for displaying a baseline screen on the basis of the baseline generated by the baseline computation unit 14. A baseline screen is a screen representative of predicted changes with time in an electric power demand in a prescribed period of the day in absence of a DR request and also representative of changes with time in the electric power demand that occur in a demand response request period in response to a DR request.

The baseline screen generation unit 151 also generates screen display data for displaying a baseline breakdown screen on the basis of a baseline and the generated electric energy, charged electric energy, discharged electric energy, and total electric energy consumption (consumed electric energy) of the electric power consumer (e.g., a household) that are recorded by the data storage unit 13. A baseline breakdown screen is a screen drawn by superposing the generated electric energy, charged electric energy, discharged electric energy, and consumed electric energy for the same period for which a baseline is displayed on the baseline screen.

The electric power supply and demand screen generation unit 152 generates screen display data for displaying an electric power supply and demand screen on the basis of the baseline generated by the baseline computation unit 14. The electric power supply and demand screen generation unit 152 generates a first electric power supply and demand screen and a second electric power supply and demand screen as the electric power supply and demand screen.

The first electric power supply and demand screen is a screen that visualizes an instantaneous power balance between the solar cell module 3, the storage battery 4, the power system grid 10, and the electrical appliances 102 owned by an electric power consumer at any given time on the baseline. The second electric power supply and demand screen is a screen that visualizes an instantaneous power balance between the solar cell module 3, the storage battery 4, the power system grid 10, and the electrical appliances 102 owned by an electric power consumer at any given time in a period of the day in which a DR event is scheduled to take place. Examples of the instantaneous power balance include a balance between a combination of the solar cell module 3, the storage battery 4, and the power system grid 10 and the electrical appliances 102 of an electric power consumer and a balance between the solar cell module 3 and a combination of the storage battery 4, the power system grid 10, and the electrical appliances 102. The electrical appliances 102 of an electric power consumer may be a total power consumption (consumed electric power) of the electric power consumer (e.g., a household).

The electrical appliance screen generation unit 153 generates screen display data for displaying an available electrical appliance screen (third screen containing a list of those electrical appliances 102 which can be used within a range of electric power, the range being restricted in accordance with a decrease or increase in an electric power demand based on a DR instruction.

All the screen display data described above is generated, for example, in HTML (hypertext markup language) format so that the terminal device 8 can display the screens using a browser function thereof.

The network communications unit 16 communicates with a network communications unit 21 in the control device 2 via the network 100 and via the router 7. The network communications unit 16 is connected to the network 100.

FIG. 1 shows a single control device 2 for convenience of description. However, there is actually provided a plurality of control devices 2, one for each electric power consumer. Each control device 2 includes a network communications unit 21, a smart meter communications unit 22, a power conditioner communications unit 23, a data collection unit 24, and a DR control unit 25.

FIG. 1 also shows the control device 2 not having the above-described HEMS control function for convenience of description. Instead, FIG. 1 shows the control device 2 having a DR control function.

The network communications unit 21 communicates with the network communications unit 16 of the server 1 over the network 100. The network communications unit 21 is connected to the network 100 via the router 7.

The smart meter communications unit 22 communicates with the smart meter 9 in order to receive data on electricity sale and purchase (sold and purchased electric energy and sold and purchased electric power) from the smart meter 9 and to output the received data to the data collection unit 24.

The power conditioner communications unit 23 communicates with the power conditioner 5. The power conditioner communications unit 23 receives data on the generated electric energy, charged electric energy, discharged electric energy, generated electric power, charged electric power, and discharged electric power as measured by the power conditioner 5 and outputs the received data to the data collection unit 24.

The data collection unit 24 collects and temporarily stores these sets of data on electric energy and electric power via the smart meter communications unit 22 and the power conditioner communications unit 23. The data collection unit 24 may collect the data at any timing, for example, at regular intervals (e.g., every 30 minutes).

The DR control unit 25 gives control instructions to the power conditioner 5 via the power conditioner communications unit 23 on the basis of a DR instruction received from the DR instruction unit 12 via the network communications unit 21. These control instructions are related to the control of the storage battery 4 and the solar cell module 3. The DR control unit 25 also gives control instructions to the electrical appliances 102 via the network communications unit 21 and the router 7 on the basis of a DR instruction received from the DR instruction unit 12 via the network communications unit 21. These control instructions are related to the control of the electrical appliances 102. The electrical appliances 102 may include air conditioners, lighting devices, televisions, and other electrical appliances with a network communications capability that are externally controllable. The router 7 is connected to at least one electrical appliance 102.

Operations of DR Simulation System

Figure 3:
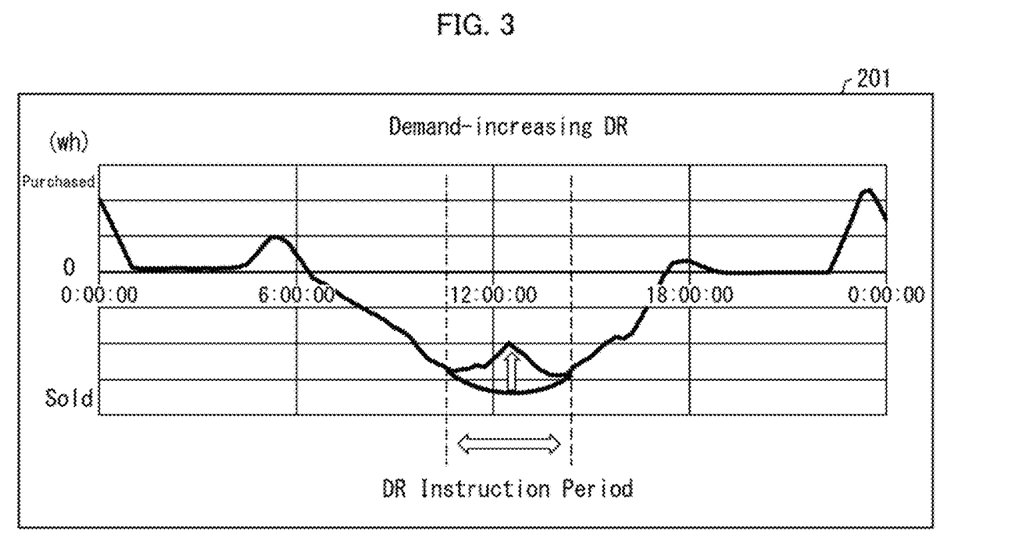
FIG. 3 is an illustration of a baseline screen displayed on a terminal device of the demand response simulation system.
Figure 4:
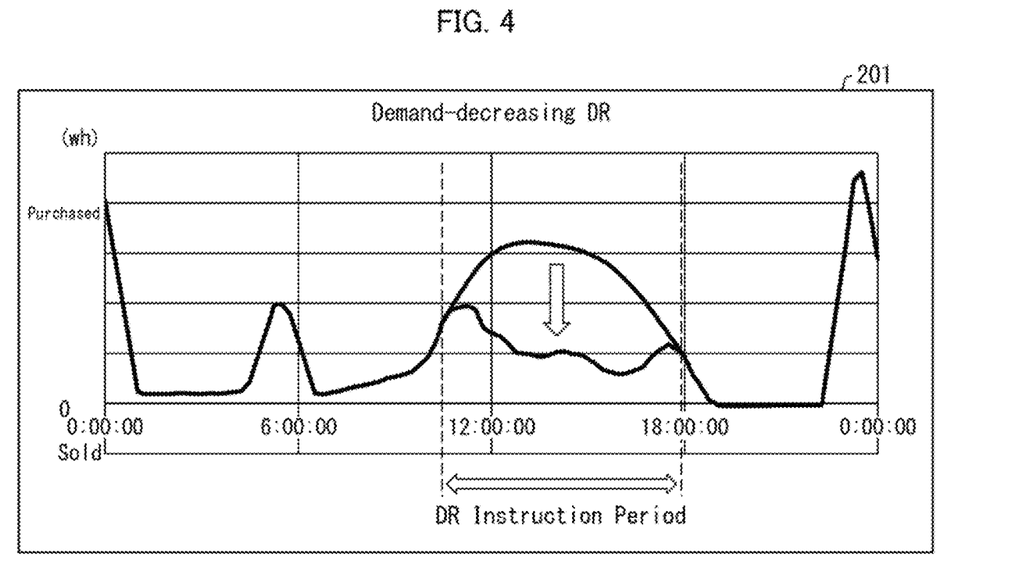
FIG. 4 is an illustration of another baseline screen.
Figure 5:
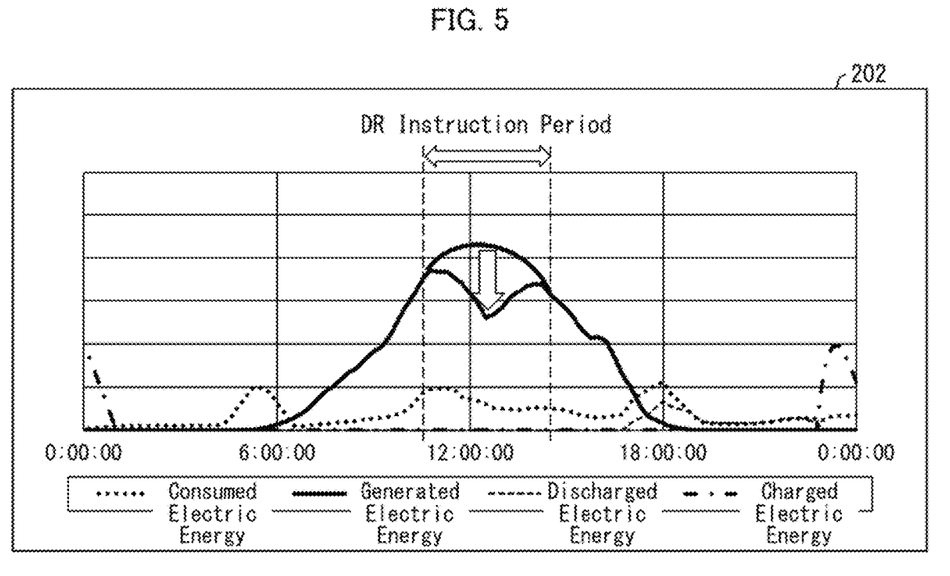
FIG. 5 is an illustration of a baseline breakdown screen displayed on the terminal device.

A description will be now given of operations of a DR simulation system configured as above. FIG. 3 is an illustration of a baseline screen 201 displayed on the terminal device 8 of the DR simulation system. FIG. 4 is an illustration of another baseline screen 201. FIG. 5 is an illustration of a baseline breakdown screen 202 displayed on the terminal device 8.

First, in the server 1, the DR instruction unit 12 outputs a DR instruction to each electric power consumer upon receiving a DR from the electric power company 101. The DR instruction unit 12 generates a DR for each electric power consumer on the basis of information including the capability of the solar cell module 3 owned by the electric power consumer, the capacity of the storage battery 4, and the baseline generated for the electric power consumer. The DR instruction unit 12 obtains in advance a baseline for the electric power consumer from the baseline computation unit 14 to generate a DR.

The baseline computation unit 14 computes a baseline on the basis of electric energy purchase data and electric energy sale data obtained from the control device 2 and stored in the data storage unit 13.

Upon receiving a request to display a baseline screen from the terminal device 8, the baseline screen generation unit 151 in the screen generation unit 15 generates screen display data for displaying a baseline screen on the basis of the baseline computed by the baseline computation unit 14. The baseline screen generation unit 151 then transmits the generated screen display data to the terminal device 8 via the network communications unit 16 and over the network 100. The terminal device 8 displays the baseline screen 201 (first screen) shown in FIGS. 3 and 4 on the basis of the incoming screen display data.

The baseline screen 201 contains, in addition to a baseline, a DR-instruction-based decrease in an electric power demand (denoted by a downward arrow) and a DR-instruction-based increase in an electric power demand (denoted by an upward arrow). The baseline screen 201 also contains, in addition to a baseline, an electric power demand that reflects these decrease and increase.

The baseline screen 201 shown in FIG. 3 shows that there is an instruction to increase the electric power demand (demand-increasing DR) in a DR instruction period (DR request period) that spans across 12:00 hours. Meanwhile, the baseline screen 201 shown in FIG. 4 shows that there is an instruction to decrease the electric power demand (demand-decreasing DR) in a long DR instruction period that starts before 12:00 hours and ends before 18:00 hours.

Upon receiving a request to display a baseline breakdown screen from the terminal device 8, the baseline screen generation unit 151 generates screen display data for displaying a baseline breakdown screen on the basis of the purchased electric energy, sold electric energy, generated electric energy, charged electric energy, and discharged electric energy stored in the data storage unit 13. The baseline screen generation unit 151, in the generation of screen display data, computes the electric energy consumed by the electric power consumer at any given time on the basis of the purchased electric energy, sold electric energy, generated electric energy, charged electric energy, and discharged electric energy at that time. Specifically, the baseline screen generation unit 151 computes the consumed electric energy for a period of the day in which the electrical appliances 102 are used, by subtracting the sum of the electric energy sold and charged in that period from the sum of the electric energy purchased, generated, and discharged in the same period.

The baseline screen generation unit 151 transmits the generated screen display data to the terminal device 8 via the network communications unit 16 and over the network 100. The terminal device 8 then displays the baseline breakdown screen 202 (second screen) shown in FIG. 5 on the basis of the incoming screen display data.

The baseline breakdown screen 202 is a screen containing a graph drawn by superposing the generated electric energy, charged electric energy, discharged electric energy, and consumed electric energy for the same period as a baseline is displayed on the baseline screen 201. The sum of the generated electric energy, charged electric energy, discharged electric energy, and electric energy consumption of the electric power consumer at any given time is equal to the electric power demand on the baseline at that time.

The baseline breakdown screen 202 does not necessarily contain all of the generated electric energy, charged electric energy, discharged electric energy, and consumed electric energy, but needs only to contain at least any one of the generated electric energy, charged electric energy, discharged electric energy, and consumed electric energy.

The baseline breakdown screen 202 may also contain the generated electric energy, charged electric energy, discharged electric energy, and consumed electric energy for a period that differs from the period (baseline display period) for which the baseline screen 201 contains a baseline. The baseline breakdown screen 202 contains these types of electric energy for a period that, for example, corresponds to a baseline display period for the baseline screen 201. This period may be a part of the baseline display period if the period spans across a DR instruction period.

The baseline screen 201 and the baseline breakdown screen 202 may be switchably displayed on the terminal device 8. Specifically, the user operates, for example, a select button displayed on the terminal device 8. In response to this user operation, the terminal device 8 transmits a screen-switching request to the baseline screen generation unit 151. The baseline screen generation unit 151 then receives the request and transmits screen display data for displaying a new screen to the terminal device 8.

The network communications unit 16 transmits a DR instruction to the control device 2 over the network 100. The DR instruction unit 12 gives the control instructions generated on the basis of the received DR instruction to the power conditioner 5 and the electrical appliances 102.

The power conditioner 5, on the basis of the control instructions, controls the charging/discharging of the storage battery 4 and restricts the output of the solar cell module 3 as needed. The electrical appliances 102 stop, start, or change operation on the basis of the control instructions.

Upon checking on the basis of the data collected on the foregoing types of electric energy by the data collection unit 24 in the control device 2 that the electric power demand of each electric power consumer is being satisfied as instructed, the DR instruction unit 12 notifies so to the electric power company 101.

Advantages of DR Simulation System

As described in the foregoing, in the DR simulation system in accordance with the present embodiment, the server 1 includes the baseline screen generation unit 151. The baseline screen generation unit 151 generates screen display data for displaying a baseline screen representative of a baseline and also representative of changes with time in an electric power demand that occur in a DR request period in response to a DR request. In addition, the baseline screen generation unit 151 transmits the generated screen display data to the terminal device 8 in response to a request from the terminal device 8.

This configuration enables a visualized presentation to the user of a baseline that serves as a reference for DR instructions. The visualized baseline enables the user to readily recognize how a daily electric power demand changes. The visualized baseline also enables the user to readily recognize by approximately how much the user will be requested in an actual DR instruction to decrease or increase the electric power demand relative to the baseline.

The baseline screen generation unit 151 also generates, in response to a request from the terminal device 8, screen display data for displaying a baseline breakdown screen representative of a combination of changes in a demand response request period and predicted changes in any of, or in any combination of, the generated electric energy, charged electric energy, discharged electric energy, and electric energy consumption of an electric power consumer in a period corresponding to the first screen in absence of a demand response request. The baseline screen generation unit 151 then transmits the generated screen display data to the terminal device 8 in response to a request from the terminal device 8.

This configuration enables the user to readily recognize which electric energy will be decreased or increased in response to a DR instruction.

The baseline screens 201 shown in FIGS. 3 and 4 contain a baseline representing changes in electric energy being sold and purchased. These baseline screens 201 show that electric energy is sold or purchased in a limited quantity, but fail to show specifically which of the generated electric energy, charged electric energy, discharged electric energy, and consumed electric energy is controlled.

In contrast, the baseline breakdown screen 202 shown FIG. 5 shows the generated electric energy, charged electric energy, discharged electric energy, and consumed electric energy individually. The baseline breakdown screen 202, as an example, shows that electric energy generation is reduced in response to a DR instruction. Hence, given a display of the baseline breakdown screen 202, which is a modification of the baseline screen 201 in FIG. 3, the user can now recognize whether the quantity of electric energy being sold is reduced by decreasing electric energy generation or by increasing electric energy charge. Meanwhile, given a display of the baseline breakdown screen 202, which is a modification of the baseline screen 201 in FIG. 4, the user can now recognize whether the quantity of electric energy being purchased is reduced by decreasing electric energy consumption or by increasing electric energy discharge.

Embodiment 2

The following will describe Embodiment 2 of the present invention in reference to FIGS. 1, 3, and 6 to 10. Members of the present embodiment that have the same function as members of Embodiment 1 are indicated by the same reference numerals, and description thereof is omitted.

Figure 6:
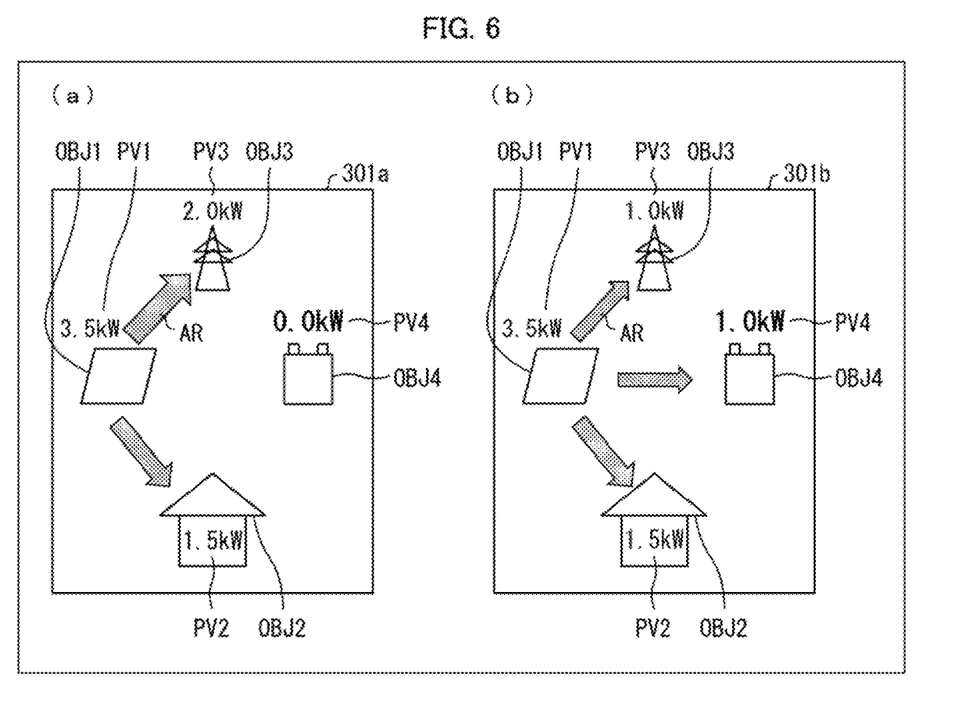
FIG. 6 depicts a demand response simulation system in accordance with Embodiment 2 of the present invention. Portion (a) of FIG. 6 represents an electric power supply and demand screen for a display of electric power supply and demand relative to a baseline. Portion (b) of FIG. 6 represents an electric power supply and demand screen for a display of electric power supply and demand when a storage battery charges under control in accordance with a demand response.
Figure 7:
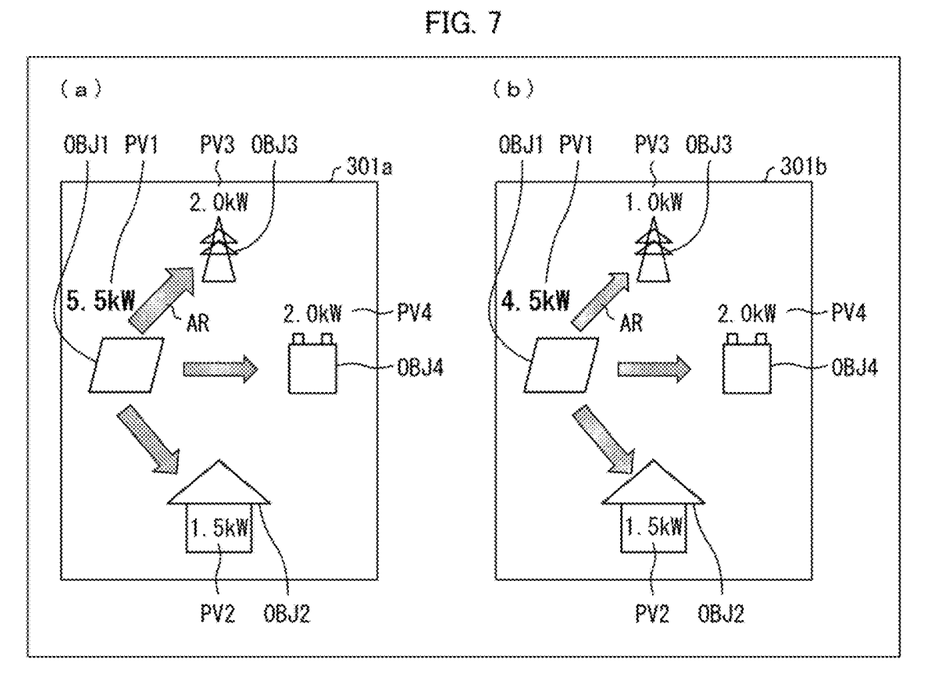
FIG. 7 depicts a demand response simulation system in accordance with Embodiment 2. Portion (a) of FIG. 7 represents an electric power supply and demand screen for a display of electric power supply and demand relative to a baseline. Portion (b) of FIG. 7 represents an electric power supply and demand screen tor a display of electric power supply and demand when a solar cell module outputs solar-generated electric power under control in accordance with a demand response.
Figure 8:
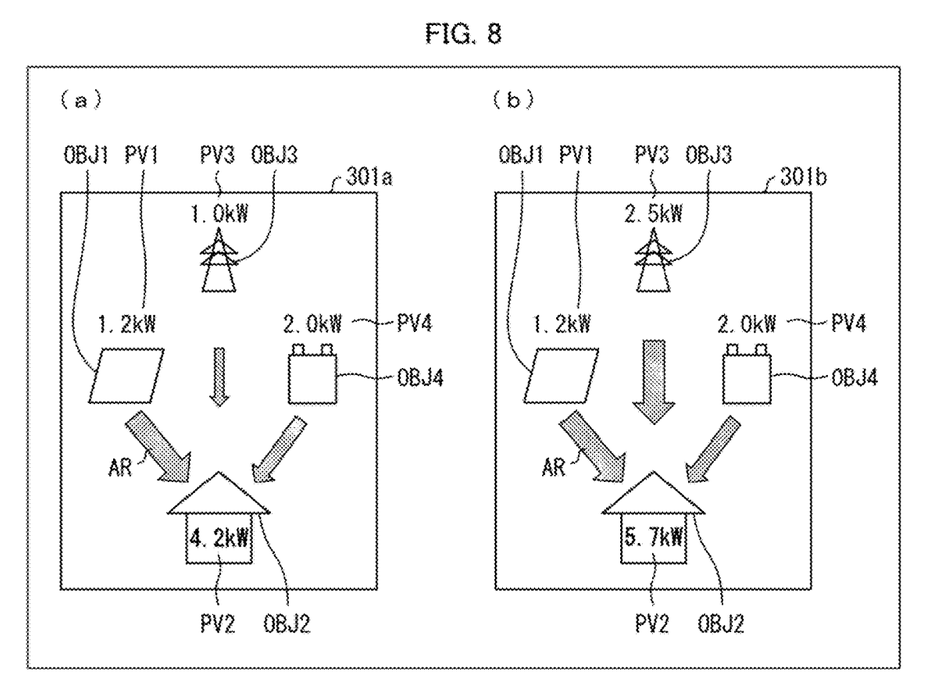
FIG. 8 depicts a demand response simulation system in accordance with Embodiment 2. Portion (a) of FIG. 8 represents an electric power supply and demand screen for a display of electric power supply and demand relative to a baseline. Portion (b) of FIG. 8 represents an electric power supply and demand screen for a display of electric power supply and demand when electrical appliances increase power consumption thereof under control in accordance with a demand response.
Figure 9:
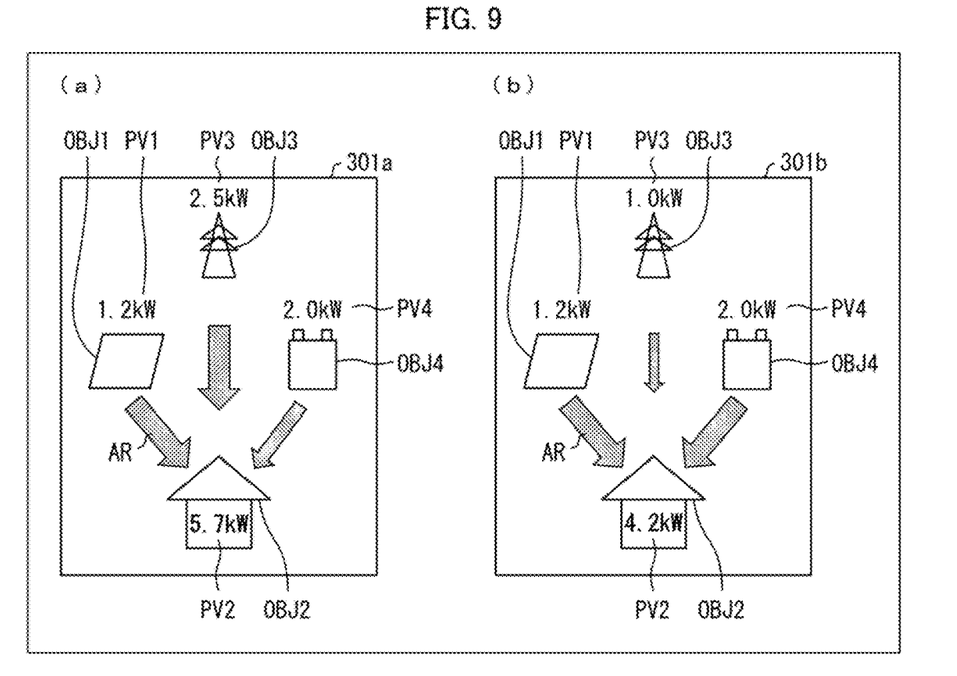
FIG. 9 depicts a demand response simulation system in accordance with Embodiment 2. Portion (a) of FIG. 9 represents an electric power supply and demand screen for a display of electric power supply and demand relative to a baseline. Portion (b) of FIG. 9 represents an electric power supply and demand screen for a display of electric power supply and demand when electrical appliances decrease power consumption thereof under control in accordance with a demand response.
Figure 10:
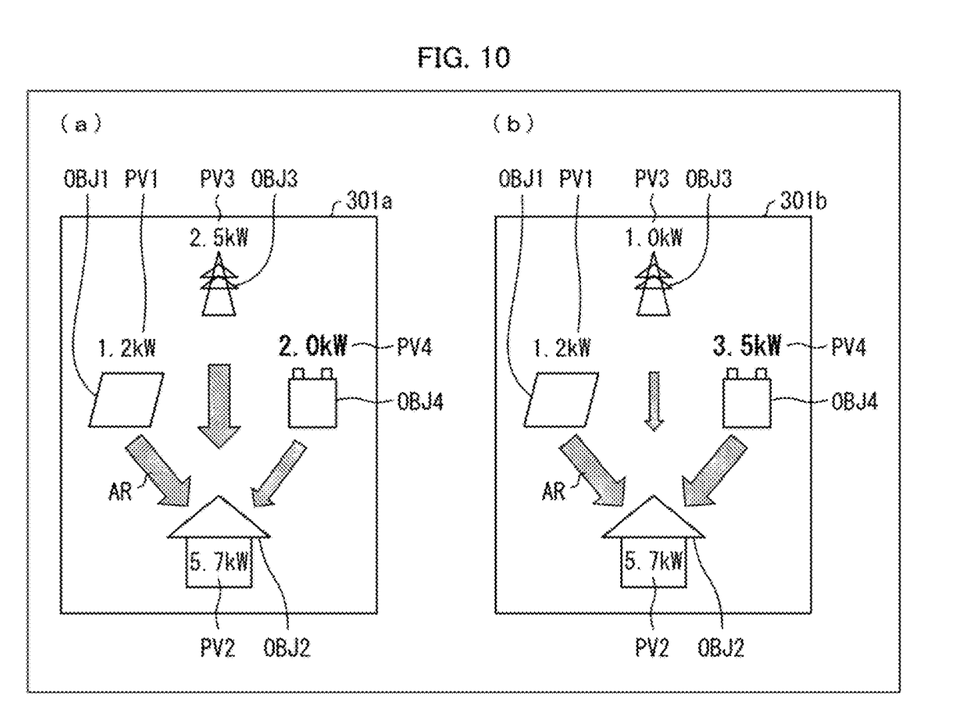
FIG. 10 depicts a demand response simulation system in accordance with Embodiment 2. Portion (a) of FIG. 10 represents an electric power supply and demand screen for a display of electric power supply and demand relative to a baseline. Portion (b) of FIG. 10 represents an electric power supply and demand screen for a display of electric power supply and demand when a storage battery discharges under control in accordance with a demand response.

Portion (a) of FIG. 6 represents an electric power supply and demand screen 301a for a display of electric power supply and demand relative to a baseline. Portion (b) of FIG. 6 represents an electric power supply and demand screen 301b for a display of electric power supply and demand when a storage battery charges under control in accordance with a DR. Portion (a) of FIG. 7 represents an electric power supply and demand screen 301a for a display of electric power supply and demand relative to a baseline. Portion (b) of FIG. 7 represents an electric power supply and demand screen 301b for a display of electric power supply and demand when a solar cell module outputs solar-generated electric power under control in accordance with a DR. Portion (a) of FIG. 8 represents an electric power supply and demand screen 301a for a display of electric power supply and demand relative to a baseline. Portion (b) of FIG. 8 represents an electric power supply and demand screen 301b for a display of electric power supply and demand when electrical appliances 102 increase power consumption thereof under control in accordance with a DR. Portion (a) of FIG. 9 represents an electric power supply and demand screen 301a for a display of electric power supply and demand relative to a baseline. Portion (b) of FIG. 9 represents an electric power supply and demand screen 301b for a display of electric power supply and demand when electrical appliances 102 decrease power consumption thereof under control in accordance with a DR. Portion (a) of FIG. 10 represents an electric power supply and demand screen 301a for a display of electric power supply and demand relative to a baseline. Portion (b) of FIG. 10 represents an electric power supply and demand screen 301b for a display of electric power supply and demand when a storage battery 4 discharges under control in accordance with a DR.

A DR simulation system in accordance with the present embodiment has the configuration shown in FIG. 1.

In the DR simulation system in accordance with the present embodiment, the instantaneous power (i.e., the sold electric power, purchased electric power, generated electric power, charged electric power, and discharged electric power) collected by the data collection unit 24 is uploaded to the server 1 for storage in the data storage unit 13 at regular intervals. The instantaneous power may be calculated by any method provided that the instantaneous power corresponds to a time on the baseline and an electric power level at that time.

In the DR simulation system, if the user taps on the time axis in the baseline screen 201 displayed on the terminal device 8, the terminal device 8 outputs a request to display an electric power supply and demand screen for the time specified by the tapping. A time is not necessarily selected by a user tapping and may be selected, for example, by the user selecting a desired time from a dropdown list of times displayed on the baseline screen 201.

This request is sent to the screen generation unit 15 via the network 100 and the network communications unit 16. In response to the request, the electric power supply and demand screen generation unit 152 (third screen generation unit, fourth screen generation unit) in the screen generation unit 15 generates screen display data for displaying an electric power supply and demand screen on the basis of data on all the instantaneous power stored in the data storage unit 13.

The electric power supply and demand screen generation unit 152, the generation of an electric power supply and demand screen, computes the power consumption of an electric power consumer on the basis of the sold electric power, purchased electric power, generated electric power, charged electric power, and discharged electric power. Specifically, the electric power supply and demand screen generation unit 152 computes the power consumption for a period of the day in which the electrical appliances 102 are used, by subtracting the sum of the electric power sold and charged in that period from the sum of the electric power purchased, generated, and discharged in the same period. The electric power supply and demand screen generation unit 152 generates screen display data, for example, on the basis of an average of the instantaneous power over a period (e.g., a few days) prior to a specified time.

The electric power supply and demand screen generation unit 152 then transmits the generated screen display data to the terminal device 8 via the network communications unit 16 and over the network 100. The terminal device 8 displays, for example, the electric power supply and demand screen 301a (fourth screen) shown in (a) of FIG. 6 and the electric power supply and demand screen 301b (third screen) shown in (b) of FIG. 6 on the basis of the incoming screen display data.

The electric power supply and demand screen 301a is representative of a predicted instantaneous power balance between the solar cell module 3, the storage battery 4, the power system grid 10, and the electric power consumer at the user-selected time relative to a baseline. The electric power supply and demand screen 301b is representative of a predicted instantaneous power balance between the solar cell module 3, the storage battery 4, the power system grid 10, and the electric power consumer at the specified time in accordance with a DR instruction.

The electric power supply and demand screens 301a and 301b include objects OBJ1 to OBJ4, electric power levels PV1 to PV4, and arrows AR.

The object OBJ1 represents the solar cell module 3. The object OBJ2 represents an electric power consumer (home). The object OBJ3 represents the power system grid 10. The object OBJ4 represents the storage battery 4. The objects OBJ1 to OBJ4 will be referred to simply as the objects OBJ throughout the rest of the description unless there is a need to distinguish between them.

The electric power level PV1 indicates an electric power output of the solar cell module 3. The electric power level PV2 indicates an electric power consumption of an electric power consumer. The electric power level PV3 indicates an electric power sale to, and purchase from, the power system grid 10. The electric power level PV4 indicates an electric power charge to, and discharge from, the storage battery 4.

The arrows AR are drawn between two objects OBJ. Each arrow AR has a direction indicating the supply flow of electric power and a width indicating the magnitude of the electric power. The arrow AR hence represents the flow and magnitude of electric power. The flow and magnitude of electric power are not necessarily represented by the arrow AR.

Example of Electric Power Control

The following will describe exemplary electric power control performed in accordance with a DR. In each example of electric power control described below, the storage battery 4 is most preferably charged in response to a demand-increasing DR if the storage battery 4 is not fully charged. Each electric power consumer who receives a DR has a contract stipulating specific DR contents with the electric power company 101 and an aggregator. Actual control may vary depending on the contract contents.

(1) Control of Charge to Storage Battery 4

A baseline indicates, as shown in (a) of FIG. 6, that the electric power generated by the solar cell module 3 is partly supplied to the electric power consumer (1.5 kW) and partly sold to the power system grid 10 (2.0 kW). In response to a prediction made by the DR instruction unit 12 based on an issued DR (demand-increasing DR), electric power sale is reduced in a DR instruction period in which increases in the electric power demand are requested. Portion (b) of FIG. 6 visually shows that electric power sale is reduced to 1.0 kW and that 1.0 kW of the total electric power generation of the solar cell module 3 is instead diverted to charge the storage battery 4.

(2) Control of Output of Solar Cell Module 3

A baseline indicates, as shown in (a) of FIG. 7, that the electric power generated by the solar cell module 3 (5.5 kW) is partly sold to the power system grid 10 (2.0 kW). In response to a prediction made by the DR instruction unit 12 based on an issued DR (demand-increasing DR), electric power sale is reduced in a DR instruction period in which increases in the electric power demand are requested. Portion (b) of FIG. 7 visually shows that the electric power generation of the solar cell module 3 is restricted to 4.5 kW.

(3) Control of Increase of Power Consumption

A baseline indicates, as shown in (a) of FIG. 8, that the electric power consumer is supplied with electric power by the solar cell module 3, the storage battery 4, and the power system grid 10 and that of this total quantity, the electric power consumer purchases 1.0 kW from the power system grid 10. In response to a prediction made by the DR instruction unit 12 based on an issued DR (demand-increasing DR), electric power purchase is increased in a DR instruction period in which increases in the electric power demand are requested. Portion (b) of FIG. 8 visually shows that the electric power purchase from the power system grid 10 is increased to 2.5 kW.

(4) Control of Decrease of Power Consumption

A baseline indicates, as shown in (a) of FIG. 9, that the electric power consumer is supplied with electric power by the solar cell module 3, the storage battery 4, and the power system grid 10 and that of this total quantity, the electric power consumer purchases 2.5 kW from the power system grid 10. In response to a prediction made by the DR instruction unit 12 based on an issued DR (demand-decreasing DR), electric power purchase is reduced in a DR instruction period in which decreases in the electric power demand are requested. Portion (b) of FIG. 9 visually shows that the electric power purchase from the power system grid 10 is reduced to 1.0 kW.

(5) Control of Discharge from Storage Battery 4

A baseline indicates, as shown in (a) of FIG. 10, that the electric power discharge from the storage battery 4 is supplied to the electric power consumer (2.0 kW). In response to a prediction made by the DR instruction unit 12 based on an issued DR (demand-decreasing DR), electric power purchase is reduced in a DR instruction period in which decreases in the electric power demand are requested. Portion (b) of FIG. 10 visually shows that the electric power purchase is reduced to 1.0 kW and that the electric power discharge from the storage battery 4 is instead increased to 3.5 kW.

It is possible to respond flexibly to DRs if there is provided a backup storage battery or reserved a part of the capacity of the storage battery 4 for use in a DR request event.

Advantages of DR Simulation System

As described in the foregoing, the DR simulation system in accordance with the present embodiment includes the server 1 which in turn includes the electric power supply and demand screen generation unit 152. The electric power supply and demand screen generation unit 152 generates screen display data for displaying an electric power supply and demand screen that displays a state of electric power supply and demand between the solar cell module 3, the power system grid 10, the storage battery 4, and the electrical appliances 102 owned by the electric power consumer at a prescribed time in a DR request event. The electric power supply and demand screen generation unit 152 then transmits the generated screen display data to the terminal device 8 in response to a request from the terminal device 8.

This configuration enables the user to readily recognize the state of electric power supply and demand between the solar cell module 3, the storage battery 4, the power system grid 10, and the electric power consumer on the basis of a baseline and a DR instruction. Therefore, the user can recognize how the electric power supply and demand balance will be changed, and how much freely the electric power consumer can use electric power, in a DR instruction event.

The terminal device 8 displays the electric power supply and demand screens 301a and 301b independently. Alternatively, the terminal device 8 may arrange the states of electric power supply and demand contained in the electric power supply and demand screens 301a and 301b side by side to display the states in a single screen (fifth screen). To this end, the electric power supply and demand screen generation unit 152 (fifth screen generation unit) generates screen display data for displaying that single screen. The side-by-side arrangement and display of the states of electric power supply and demand contained in the electric power supply and demand screens 301a and 301b enables the user to compare the state of electric power supply and demand that is based on a baseline and the state of electric power supply and demand that would occur in response to a DR.

The user may be allowed to select one of control methods (1) to (5) described above in accordance with the contents of a DR. Specifically, in response to a request from the terminal device 8, the electric power supply and demand screen generation unit 152 transmits, to the terminal device 8, screen display data for displaying an electric power supply and demand screen for all (two or more) DR patterns in accordance with a demand-increasing DR or a demand-decreasing DR. The terminal device 8 sequentially displays electric power supply and demand screens in a selectable manner on the basis of the incoming screen display data in response to a user operation. The terminal device 8 notifies the DR control unit 25 of a control method (control content) that corresponds to the selected electric power supply and demand screen via the router 7 and the network communications unit 21. The DR control unit 25 controls the solar cell module 3, the storage battery 4, and the electrical appliances 102 on the basis of the user-selected control method.

In the present embodiment, an electric power supply and demand screen is displayed in response to a tapping or like operation while a baseline screen is being displayed. Alternatively or additionally, an electric power supply and demand screen may be displayed in response to a tapping or like operation while a baseline breakdown screen is being displayed.

Embodiment 3

Figure 11:
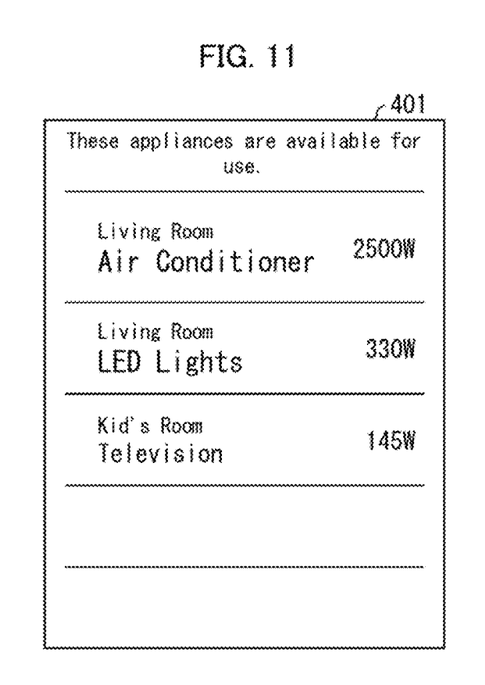
FIG. 11 is an illustration of a screen displayed on a terminal device of a demand response simulation system in accordance with Embodiment 3 in order to display a list of electrical appliances available for use in a demand response event.

The following will describe Embodiment 3 of the present invention in reference to FIGS. 1, 6, and 11. Members of the present embodiment that have the same function as members of Embodiments 1 and 2 are indicated by the same reference numerals, and description thereof is omitted.

FIG. 11 is an illustration of a screen displayed on a terminal device 8 of a DR simulation system in accordance with the present embodiment in order to display a list of the electrical appliances 102 available for use in a DR event.

When the object OBJ2 shown in (a) and (b) of FIG. 6 is tapped on the terminal device 8 in the DR simulation system in accordance with the present embodiment, an available electrical appliance screen is displayed in the following manner.

A request for a display of an available electrical appliance screen, generated in response to the tapping, is sent to the screen generation unit 15 via the network 100 and the network communications unit 16. The electrical appliance screen generation unit 153 (sixth screen generation unit) in the screen generation unit 15 receives the request and generates screen display data for displaying an available electrical appliance screen. The electrical appliance screen generation unit 153, in the generation of screen display data, selects those electrical appliances 102 which can be used within the range of electric power that is restricted in accordance with a decrease or increase in an electric power demand based on a DR instruction. This selection is done on the basis of the power consumptions of the electrical appliances 102 obtained from the list of the electrical appliances 102 of each electric power consumer that is stored in the data storage unit 13.

The screen generation unit 15 transmits the screen display data generated by the electrical appliance screen generation unit 153 for displaying an available electrical appliance screen to the terminal device 8 via the network communications unit 16 and over the network 100. The terminal device 8 displays an available electrical appliance screen 401 (sixth screen) shown in FIG. 11 on the basis of the incoming screen display data.

The available electrical appliance screen 401 contains a list of the names and power consumptions of those electrical appliances 102 which can be used within the range of electric power that the electric power consumer is allowed to use in a baseline and DR event.

As described in the foregoing, the DR simulation system in accordance with the present embodiment includes the server 1 which in turn includes the electric power supply and demand screen generation unit 152. The electric power supply and demand screen generation unit 152 generates screen display data for displaying an available electrical appliance screen containing a list of those electrical appliances 102 which can be used within the range of electric power that the electric power consumer is allowed to use out of all the electrical appliances 102 owned by the electric power consumer and contained in the electric power supply and demand screen.

This configuration enables the user to readily recognize, on the available electrical appliance screen 401, those electrical appliances 102 which can be used within the range of electric power indicated on the object OBJ2 in a baseline and DR event.

Approximately how much electric power is used in each period of a typical day can be roughly predicted by the server 1 computing a baseline. Therefore, it becomes possible to infer from the prediction which of the electrical appliances 102 can be used in accordance with decreases in an electric power demand in response to a DR relative to a baseline.

The present embodiment has so far described an example where those electrical appliances 102 which can be used within the range of electric power indicated on the object OBJ2 are displayed on the available electrical appliance screen in a baseline and DR event. Alternatively, a non-available electrical appliance screen containing a list of those electrical appliances 102 which cannot be used within the range of electric power indicated on the object OBJ2 may be displayed on the terminal device 8 in a baseline and DR event, in which case the non-available electrical appliance screen is generated by the electrical appliance screen generation unit 153.

The electrical appliance screen generation unit 153, in the generation of screen display data, selects those electrical appliances 102 which cannot be used within the range of electric power that is restricted in accordance with a decrease or increase in an electric power demand based on a DR instruction. In this selection, the electrical appliance screen generation unit 153 selects those electrical appliances 102 which, when turned off in a DR event, would not interrupt the everyday life of the electric power consumer. This selection is done on the basis of the power consumptions of the electrical appliances 102 obtained from the list of the electrical appliances 102 of each electric power consumer that is stored in the data storage unit 13. As an example, the refrigerator (electrical appliance 102), which needs to run around the clock, should be kept turned on and must not be selected. The air conditioner (electrical appliance 102), which may lower the quality of life of the electric power consumer if it stops running in a period of the summer or winter day when the electric power consumer is being active, should be kept turned on and must not be selected. In contrast, the heating cooker (e.g., microwave oven) or like electrical appliance (electrical appliances 102), which may not be used in a DR event, may be selected.

Software Implementation

The control blocks of the server 1 (particularly, the DR instruction unit 12, the baseline computation unit 14, and the screen generation unit 15) may be implemented by logic circuits (hardware) fabricated, for example, in the form of an integrated circuit (IC chip) and may be implemented by software.

In the latter form of implementation, the server 1 includes a computer that executes instructions from programs or software by which various functions are implemented. As shown in FIG. 1, this computer includes among others at least one processor 18 and at least one storage medium containing the programs in a computer-readable format. The processor 18 in the computer then retrieves and executes the programs contained in the storage medium, thereby achieving the object of the present invention.

The processor 18 may be, for example, a CPU (central processing unit). The storage medium may be a "non-transient, tangible medium" such as a ROM (read-only memory), a tape, a disc, a card, a semiconductor memory, or programmable logic circuitry. The server 1 may further include, for example, a RAM (random access memory) for loading the programs.

The programs may be fed to the computer via any transmission medium (e.g., over a communications network or by broadcasting waves) that can transmit the programs. The present invention, in an aspect thereof, encompasses data signals on a carrier wave that are generated during electronic transmission of the programs.

General Description

The present invention, in aspect 1 thereof, is directed to an electric power information generation device including a first screen generation unit (baseline screen generation unit 151) configured to generate screen display information for displaying a first screen (baseline screen 201) showing: a predicted change with time in an electric power demand in a prescribed period in absence of a demand response request; and a change with time in an electric power demand in a demand response request period in accordance with a demand response request.

This configuration enables a visualized presentation to the user of a change in an electric power demand (baseline) that serves as a reference for a DR instruction. The visualized baseline enables the user to readily recognize how a daily electric power demand changes. The visualized baseline also enables the user to readily recognize by approximately how much the user will be requested in an actual DR instruction to decrease or increase the electric power demand relative to the baseline.

In aspect 2 of the present invention, the electric power information generation device of aspect 1 may be configured to further include a second screen generation unit configured to generate screen display information for displaying a second screen showing a combination of: a predicted change in any of, or in any combination of, electric energy generated by a power generation device, electric energy charged to a storage battery, electric energy discharged from the storage battery, and electric energy consumed by an electric power consumer in a period corresponding to the first screen in absence of a demand response request; and a change in the electric energy or in the combination of electric energy in the demand response request period.

This configuration enables the user to readily recognize which electric energy (electric energy generated, electric energy charged, electric energy discharged, or electric energy consumed by an electric power consumer) will be decreased or increased in response to a DR instruction.

In aspect 3 of the present invention, the electric power information generation device of aspect 1 or 2 may be configured to further include a third screen generation unit (electric power supply and demand screen generation unit 152) configured to generate screen display information for displaying at least one third screen (electric power supply and demand screen 301b) showing a state of electric power supply and demand between a power generation device (solar cell module 3), a power system grid 10, a storage battery 4, and at least one electrical appliance 102 owned by an electric power consumer at a prescribed time in accordance with a demand response request.

This configuration enables the user to readily recognize the state of electric power supply and demand between the power generation device, the storage battery, the power system grid, and the electric power consumer on the basis of a baseline and a DR instruction. Therefore, the user can recognize how the electric power supply and demand balance will be changed, and how much freely the electric power consumer can use electric power, in response to a DR instruction.

In aspect 4 of the present invention, the electric power information generation device of aspect 3 may be configured to further include a fourth screen generation unit configured to generate screen display information for displaying a fourth screen showing a state of electric power supply and demand between the power generation device, the power system grid, the storage battery, and the at least one electrical appliance owned by the electric power consumer at a prescribed time in absence of a demand response request.

This configuration enables the user to readily recognize the state of electric power supply and demand between the power generation device, the storage battery, the power system grid, and the electric power consumer in absence of a demand response request.

In aspect 5 of the present invention, the electric power information generation device of aspect 4 may be configured to further include a fifth screen generation unit configured to generate screen display information for displaying a fifth screen showing, arranged side by side, the states of electric power supply and demand that are shown in the third and fourth screens.

The configuration enables the user to compare the states of electric power supply and demand that are shown in the third and fourth screens in the single, fifth screen. The user can hence recognize approximately how much the electric power demand will be restricted in response to a DR.

In aspect 6 of the present invention, the electric power information generation device of aspect 3 may be configured to further include a sixth screen generation unit configured to generate screen display information for displaying a sixth screen (available electrical appliance screen 401) showing a list of that electrical appliance 102 which can be used within a range of electric power that the electric power consumer is allowed to use, out of the at least one electrical appliance 102 owned by the electric power consumer shown in the at least one third screen.

This configuration enables the user to readily recognize, on the available electrical appliance screen, those electrical appliances which can be used within the range of electric power that the user is allowed to use in a baseline and DR event.

The present invention, in aspect 7 thereof, is directed to an electric power information display system including: the electric power information generation device (server 1) of any one of aspects 1 to 6; and a display device (terminal device 8) configured to display a screen based on the screen display information generated by the electric power information generation device.

This configuration displays each screen (first to sixth screens) on the display device owned by the user, which enables the user to readily recognize electric power demand and other conditions in accordance with the presence/absence of a DR request.

The present invention, in aspect 8 thereof, is directed to an electric power information display system including: the electric power information generation device (server 1) of any one of aspects 3 to 6; and a display device configured to display a screen based on the screen display information generated by the electric power information generation device, wherein the at least one third screen is a plurality of third screens prepared in accordance with electric power control patterns that are in accordance with a demand response request, wherein the display device may display the plurality of third screens in a selectable manner and feed a control device configured to control the power generation device, the storage battery 4, and the at least one electrical appliance 102 with a control content corresponding to a selected one of the plurality of third screens.

This configuration enables control of the power generation device, the storage battery, and the electrical appliances in a desired pattern in response to a DR.

Additional Remarks

The present invention is not limited to the description of the embodiments above and may be altered within the scope of the claims. Embodiments based on a proper combination of technical means disclosed in different embodiments are encompassed in the technical scope of the present invention. Furthermore, a new technological feature may be created by combining different technological means disclosed in the embodiments.

REFERENCE SIGNS LIST

1 Server (Electric Power Information Generation Device)
2 Control Device
3 Solar Cell Module (Power Generation Device)
4 Storage Battery
8 Terminal Device (Display Device)
15 Screen Generation Unit
18 Processor
102 Electrical Appliance
151 Baseline Screen Generation Unit (First Screen Generation Unit, Second Screen Generation Unit)
152 Electric Power Supply and Demand Screen Generation Unit (Third Screen Generation Unit, Fourth Screen Generation Unit, Fifth Screen Generation Unit)
153 Electrical Appliance Screen Generation Unit (Sixth Screen Generation Unit)
201 Baseline Screen (First Screen)
202 Baseline Breakdown Screen (Second Screen)
301a Electric Power Supply and Demand Screen (Fourth Screen)
301b Electric Power Supply and Demand Screen (Third Screen)
401 Available Electrical Appliance Screen (Sixth Screen)

What is claimed is:

1. An electric power information generation device comprising:
a storage device configured to store data regarding an electric power demand; and
a processor configured to calculate, on a basis of the data stored in the storage device and a demand response request, a first electric power demand and a second electric power demand, the first electric power demand being an electric power demand in absence of the demand response request and the second electric power demand being an electric power demand in accordance with the demand response request, and the processor further configured to generate screen display information for a display device to display a first screen showing: a predicted change with time in the first electric power demand in a prescribed period; and a change with time in the second electric power demand in a demand response request period,
the storage device storing at least two electric power data out of electric energy generated by a power generation device, electric energy charged to a storage battery, electric energy discharged from the storage battery, and electric energy consumed,
the processor generating screen display information for the display device to display a second screen showing a combination of: a predicted change in the at least two electric power data out of the electric energy generated, the electric energy charged, the electric energy discharged, and the electric energy consumed concerned with the first electric power demand; and a change in the at least one electric energy data out of the electric energy generated, the electric energy charged, the electric energy discharged, and the electric energy consumed concerned with the second electric power demand.

2. An electric power information display system comprising:
the electric power information generation device according to claim 1; and
a display device configured to display a screen based on the screen display information generated by the electric power information generation device.

3. An electric power information generation device comprising:
a storage device configured to store data regarding an electric power demand; and
a processor configured to calculate, on a basis of the data stored in the storage device and a demand response request, an electric power demand in absence of the demand response request and an electric power demand in accordance with the demand response request,
the storage device storing instantaneous electric energy data of each of purchased electric energy, sold electric energy, electric energy generated by a power generation device, electric energy charged to a storage battery, and electric energy discharged from the storage battery,
the processor further configured to generate screen display information for a display device to display a third screen showing a state of electric power supply and demand between a power generation device, a power system grid, a storage battery, and an electrical appliance at a prescribed time in accordance with the demand response request,
in the third screen, the state of electric power supply and demand being shown by a symbol indicative of the power generation device, a symbol indicative of the power system grid, a symbol indicative of the storage battery, a symbol indicative of the electrical appliance, and a symbol indicative of a direction of a supply flow of electric power.

4. The electric power information generation device according to claim 3, wherein the processor is further configured to generate screen display information for the display device to display a fourth screen showing a state of electric power supply and demand between the power generation device, the power system grid, the storage battery, and the electrical appliance at a prescribed time in absence of the demand response request,
in the fourth screen, the state of electric power supply and demand being shown by a symbol indicative of the power generation device, a symbol indicative of the power system grid, a symbol indicative of the storage battery, a symbol indicative of the electrical appliance, and a symbol indicative of a direction of a supply flow of electric power.

5. The electric power information generation device according to claim 4, wherein the processor is further configured to generate screen display information for the display device to display a fifth screen showing, arranged side by side, the states of electric power supply and demand that are shown in the third and fourth screens.

6. An electric power information generation device comprising:
a storage device configured to store data regarding an electric power demand;
a processor configured to calculate, on a basis of the data stored in the storage device and a demand response request, an electric power demand in absence of the demand response request and an electric power demand in accordance with the demand response request and
a list storage unit for storing a list of at least one electric appliance which is controllable in response to the demand response request, and power consumption of the at least one electric appliance, the processor further configured to generate, on a basis of the power consumption obtained from the list, screen display information for a display device to display a sixth screen showing a list of the electrical appliance which can be used within a range of electric power allowed to use.

7. An electric power information display system comprising:
an electric power information generation device comprising:
a first screen generation unit configured to generate screen display information for displaying a first screen showing: a predicted change with time in an electric power demand in a prescribed period in absence of a demand response request; and a change with time in an electric power demand in a demand response request period in accordance with a demand response request; and
a third screen generation unit configured to generate screen display information for displaying a plurality of third screen showing a state of electric power supply and demand between a power generation device, a power system grid, a storage battery, and at least one electrical appliance at a prescribed time in accordance with a demand response reques;t and
a display device configured to display a screen based on the screen display information generated by the electric power information generation device,
wherein each of the plurality of third screens showing different states of the electric power supply and demand,
wherein the display device displays the plurality of third screens in a selectable manner and feeds a control device configured to control the power generation device, the storage battery, and the at least one electrical appliance with a control content corresponding to a selected one of the plurality of third screens.

8. The electric power information display system according to claim 7, wherein the electric power information generation device further comprises a fourth screen generation unit configured to generate screen display information for displaying a fourth screen showing a state of electric power supply and demand between the power generation device, the power system grid, the storage battery, and the at least one electrical appliance at a prescribed time in absence of a demand response request.

9. The electric power information display system according to claim 8, wherein the electric power information generation device further comprises a fifth screen generation unit configured to generate screen display information for displaying a fifth screen showing, arranged side by side, the states of electric power supply and demand that are shown in the third and fourth screens.

10. The electric power information display system according to claim 7, wherein the electric power information generation device further comprises a sixth screen generation unit configured to generate screen display information for displaying a sixth screen showing a list of that electrical appliance which can be used within a range of electric power, out of the at least one electrical appliance shown in one of the plurality of third screens.

* * * * *